(12) United States Patent
Wang et al.

(10) Patent No.: US 7,653,258 B2
(45) Date of Patent: Jan. 26, 2010

(54) ENHANCED ISOTROPIC 2D AND 3D GRADIENT METHOD

(75) Inventors: Yuchun Eugene Wang, Dhahran (SA); Yi Luo, Dhahran (SA); Mohammed N. Alfaraj, Dhahran (SA)

(73) Assignee: Saudi Arabian Oil Company, Dhahran (SA)

( * ) Notice: Subject to any disclaimer, the term of this patent is extended or adjusted under 35 U.S.C. 154(b) by 453 days.

(21) Appl. No.: 11/787,986

(22) Filed: Apr. 17, 2007

(65) Prior Publication Data

US 2008/0260258 A1    Oct. 23, 2008

(51) Int. Cl.
G06K 9/36 (2006.01)

(52) U.S. Cl. ........................ 382/266; 382/275

(58) Field of Classification Search ............... 382/199, 382/131, 154, 266, 275
See application file for complete search history.

(56) References Cited

U.S. PATENT DOCUMENTS

| | | | | |
|---|---|---|---|---|
| 4,561,022 | A | 12/1985 | Bayer | 358/167 |
| 5,075,800 | A * | 12/1991 | Hasman et al. | 359/900 |
| 5,870,495 | A | 2/1999 | Mancuso et al. | 382/199 |
| 6,031,928 | A | 2/2000 | Scott | 382/108 |
| 6,345,107 | B1 | 2/2002 | Scott | 382/108 |
| 6,408,109 | B1 | 6/2002 | Silver et al. | 382/300 |
| 6,480,615 | B1 | 11/2002 | Sun et al. | 382/103 |
| 6,535,623 | B1 | 3/2003 | Tannenbaum et al. | 382/128 |
| 6,788,826 | B1 | 9/2004 | Van de Velde et al. | 382/275 |
| 7,027,658 | B2 | 4/2006 | Osher et al. | 382/243 |
| 7,110,602 | B2 * | 9/2006 | Krause | 382/199 |
| 2002/0146163 | A1 | 10/2002 | Frisken et al. | 382/154 |
| 2003/0086608 | A1 * | 5/2003 | Frost et al. | 382/173 |
| 2005/0152591 | A1 | 7/2005 | Kiraly et al. | 382/131 |
| 2006/0062458 | A1 | 3/2006 | Lee | 382/181 |
| 2006/0072844 | A1 | 4/2006 | Wang et al. | 382/254 |
| 2006/0104495 | A1 | 5/2006 | Cathier et al. | 382/128 |
| 2006/0140266 | A1 * | 6/2006 | Montard et al. | 375/240.2 |

OTHER PUBLICATIONS

"Computer Vision and Applications; A Guide for Students," Jahne and Haussecker, CD-ROM, pp. 325-331.
"Continuous diffusion filtering," Joachim Weickert, *Anisotropic Diffusion in Image Processing*, Chapter 2, pp. 41-42, Jan. 29, 1996.

* cited by examiner

*Primary Examiner*—Andrew W Johns
(74) *Attorney, Agent, or Firm*—Ableman, Frayne & Schwab

(57) ABSTRACT

A system and method use 2D and 3D numerical gradient operators for reducing anisotropic inaccuracies in digital image processing. Enhanced isotropic operators are derived by first parameterizing corresponding numerical operators, followed by determining the parameters for the operators by matching analytical gradients with numerical gradients, which produces generic frequency-independent operators. The system and method also optimize the design of operators for use at any given frequency range needed for any special purpose application.

14 Claims, 8 Drawing Sheets

ENHANCED ISOTROPIC 2D AND 3D GRADIENT METHOD

FIELD OF THE INVENTION

This invention relates to image processing, and in particular to the use of two-dimensional (2D) and three-dimensional (3D) numerical gradient operators for image processing.

BACKGROUND OF THE INVENTION

A digital image is represented by values at specified grid locations. A gradient vector represents the maximum change of the image values. Since image variations are of broad interest, gradient operators are extensively used in many image-processing applications, such as image diffusion, edge detection and curvature computation.

Several gradient operators are commonly used today in the image-processing field. Examples of such gradient operators are: Simple Difference, Sobel, "Isotropic", and Prewitt. Such operators and their applications are described in greater detail in U.S. Pat. Nos. 4,561,022; 5,870,495; 6,031,928; 6,345,107; 6,408,109; 6,480,615; 6,535,623; 6,788,826; and 7,027,658; US2002/0146163; and in published U.S. patent applications US2005/0152591; US2006/0062458; US2006/0072844; and US2006/0104495.

U.S. Pat. No. 4,561,022 uses a biased finite difference operator for reducing noise in television images. U.S. Pat. No. 5,870,495 uses a Sobel operator as a fuzzy gradient corrector for edge detection on images to recognized geometric shapes. U.S. Pat. No. 6,031,928 and U.S. Pat. No. 6,345,107 use a central finite difference operator for processing height data to obtain image data. U.S. Pat. No. 6,408,109 uses a Sobel operator for edge detection and for detection of sub-pixels in digital images.

U.S. Pat. No. 6,480,615 uses an adaptive biased finite difference operator for video segmentation to estimate motion within a sequence of data frames for optical flow. U.S. Pat. No. 6,535,623 uses a central finite difference operator for medical image processing, in particular for cardiac data from magnetic resonance image data, with segmentation and analysis of the medical data. U.S. Pat. No. 6,788,826 uses a central finite difference operator for performing digital filtering to correct artifacts in a digital image. U.S. Pat. No. 7,027,658 uses gradient operators for geometrically accurate data compression and decompression.

US 2002/0146163 uses a central finite difference operator for determining the shape of objects. US 2005/0152591 uses gradient Magnitude, Angle and Radial distance (MARS) filter for filtering medial image data. US 2006/0062458 uses a Sobel operator on gradient direction to perform object recognition identifying objects in an image. US 2006/0072844 reduces noise to perform gradient-based image restoration and enhancement. US 2006/0104495 performs image processing on medical image data for local visualization of tubular structures in the body such as blood vessels.

None of these patents and patent applications are applied to seismic data, and the methods applied by these patents and patent applications rely on known image data processing techniques which have deficiencies in that digital anisotropy is significant and is not reduced significantly or at all. The prior art fails to determine how to obtain a better or optimal gradient operator for improved image processing.

In addition, since all of these operators (Simple Difference, Sobel, "Isotropic", and Prewitt) are generally implemented in the Cartesian coordinate system, which is intrinsically anisotropic (i.e., spacings between grid or lattice points are longer diagonally), an obvious question arises as to whether such operators are truly isotropic. In other words; if an original image rotates by a certain angle, the resultant gradient would not rotate by exactly the same angle.

In Jahne and Haubecher, "Computer Vision and Applications", Academic Press, 1999, the numerical inaccuracy of two kinds of numerical gradient operators was analyzed by applying them to plane waves, and it was pointed out that the inaccuracy (the angle error and the magnitude anisotropy) depends on both the frequency and the direction of the plane waves. The calculations in this analysis showed that for a simple-difference operator, the angle error can be as much as 7 degrees and the magnitude varies 17% at half the Nyquist frequency.

Following from the analysis in Jahne and Haubecher, which involves applying numerical operators to plane waves with a Fourier transform, any image can be decomposed into a set of sinusoids or equivalently plane-wave functions. Therefore, an operator's properties on any image can then be studied by examining its properties on plane waves.

As an extension of Jahne and Haubecher's analysis, one object of the present invention is to provide an improved solution to the problem of reducing anisotropic inaccuracies.

BRIEF SUMMARY OF THE INVENTION

A system and method use 2D and 3D numerical gradient operators for reducing anisotropic inaccuracies in digital image processing. In accordance with the invention, enhanced isotropic operators are derived by first parameterizing corresponding numerical operators, followed by determining the parameters for the operators by matching analytical gradients with numerical gradients, in order to produce generic frequency-independent operators. The system and method also optimize the design of operators for use at any given frequency range needed for any special purpose application.

First, a 2D operator is generalized with an adjustable parameter, which is applied to plane waves. Second, an analytical formula relating numerical errors to the plane-wave frequency and angle are derived. Third, a new generic operator is constructed by selecting a parameter value within a permitted range regardless of frequency and direction. Finally, the numerical inaccuracy against frequency and angle is computed, and the maximum errors are compared with those produced by conventional gradient operators, that is, Simple Difference, Sobel, "Isotropic", and Prewitt. The same methodology is extended to 3D images, and a 3D operator is similarly derived.

BRIEF DESCRIPTION OF THE DRAWINGS

Preferred embodiments of the invention are described hereinbelow with reference to the drawings wherein:

FIGS. 2-3 are pictorial representations of the weights of a simple-difference operator;

FIGS. 4-5 are pictorial representations of the weights of a Sobel operator;

FIGS. 6-7 are pictorial representations of the weights of an "Isotropic" operator;

FIGS. 8-9 are pictorial representations of the weights of a Prewitt operator;

FIGS. 10-11 are pictorial representations of the weights of an enhanced isotropic gradient operator of the present invention;

FIGS. 12-13 are pictorial representations of the weights of a generalized gradient operator;

DETAILED DESCRIPTION OF THE INVENTION

As shown in FIGS. 1-18, the present invention 10 includes a computer-based system 12 and method for processing a multidimensional image, such as inputted seismic wave data 14 for use in accurately analyzing geologic environments for improving petroleum production, with the image having specified grid locations such that application of a disclosed enhanced isotropic gradient operator to the multidimensional image data provides reduced anisotropic inaccuracies.

Figure 1:
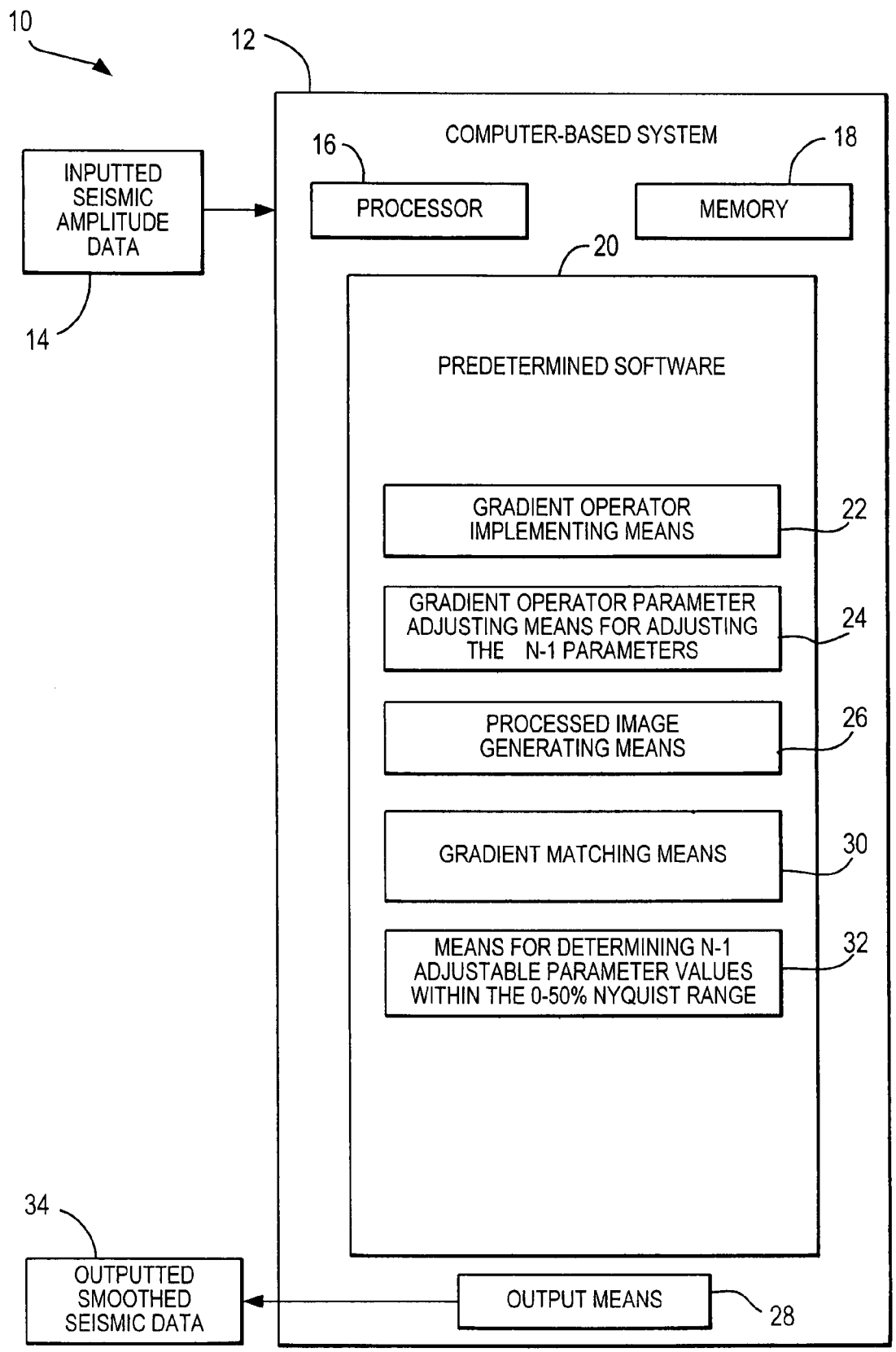
FIG. 1 is a schematic of the computer-based system of the present invention.
Figure 14:
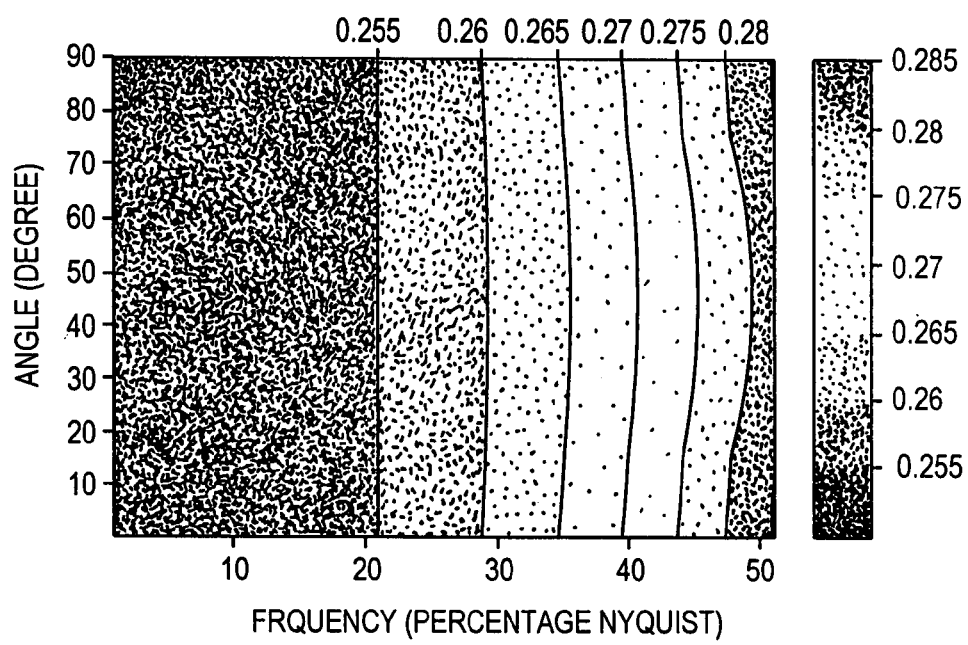
FIG. 14 is a plot of a parameter a with a banded grayscale to emphasize contours, with the value of α varying from 0.25 to 0.285, with α=0.25 being the preferred value for a 2D operator.

The computer system 12 shown in FIG. 1 includes a processor 16 and a memory 18 which receive and store the multidimensional image data 14 that is to be processed. The processor 16 can include a central processing unit (CPU) for executing predetermined software 20 for implementing: means 22 for providing a gradient operator having a gradient operator parameter as a function of frequency; means 24 for adjusting the gradient operator parameter for a frequency range to form an enhanced gradient operator implemented by the processor in order to minimize errors in processing the multidimensional image; means 26 for processing the multidimensional image at the grid locations with the enhanced gradient operator having the adjusted parameter to generate a processed image in the memory with reduced anisotropic inaccuracies; and means 28 for outputting the processed image. The means 22 for providing the gradient operator can further include or can operate in conjunction with means 30 for matching analytical and numerical gradients.

As described herein, the gradient operator parameter is about 0.25 when the frequency approaches zero, and the analytical gradient can be a plane wave function. In a preferred embodiment, the enhanced gradient operator implemented by the present invention includes weighting factors of (1, 4, 1).

The computer-based system 12 can also include, in the adjusting means 24, means for providing N−1 adjustable parameters for processing the multidimensional image having a dimension N. In addition, means 32 can be provided for determining the N−1 adjustable parameter values within the 0-50% Nyquist range.

The disclosed system and method implement 2D and 3D operators selected for use in digital image processing, such as in seismic wave data analysis, to generate the outputted processed image data 34 from the output means 32, for example, as an enhanced image of seismic data to be printed or displayed by a printer, plotter, or display screen as the output means 32.

In a first embodiment, a 2D analytical gradient applicable for 2D plane waves is implemented.

A 2D plane wave can be expressed in the exponential form as $$F(x, y) = \exp\{i\pi k(l_x x + l_y y)\}$$

$$l_x = \sin\theta$$

$$l_y = \cos\theta \quad (1)$$

where θ is the plane-wave angle, and k is the normalized frequency. Without loss of generality, in the discrete case, a grid with unit spacing is assumed. Then the normalized frequency k attains a maximum value of unity at the Nyquist limit.

The analytical gradient can be expressed by:

$$\begin{cases} \nabla_x F = \dfrac{\partial F}{\partial x} = i\pi k F \sin\theta \\ \nabla_y F = \dfrac{\partial F}{\partial y} = i\pi k F \cos\theta \end{cases} \quad (2)$$

which can be re-written in terms of angle and magnitude as follows:

$$\begin{cases} A = \tan^{-1}\left(\dfrac{\nabla_x F}{\nabla_y F}\right) = \tan^{-1}\left(\dfrac{\sin\theta}{\cos\theta}\right) = \theta \\ D = \left|\sqrt{\nabla_x^2 F + \nabla_y^2 F}\right| = k\pi F \end{cases} \quad (3)$$

Since the exact gradient vector (angle and magnitude) is known for any given plane wave, the inaccuracy of numerical results can consequently be determined by comparison with equation (3).

2D Numerical Gradient

Figures 2, 3, 4, 5, 6, 7:
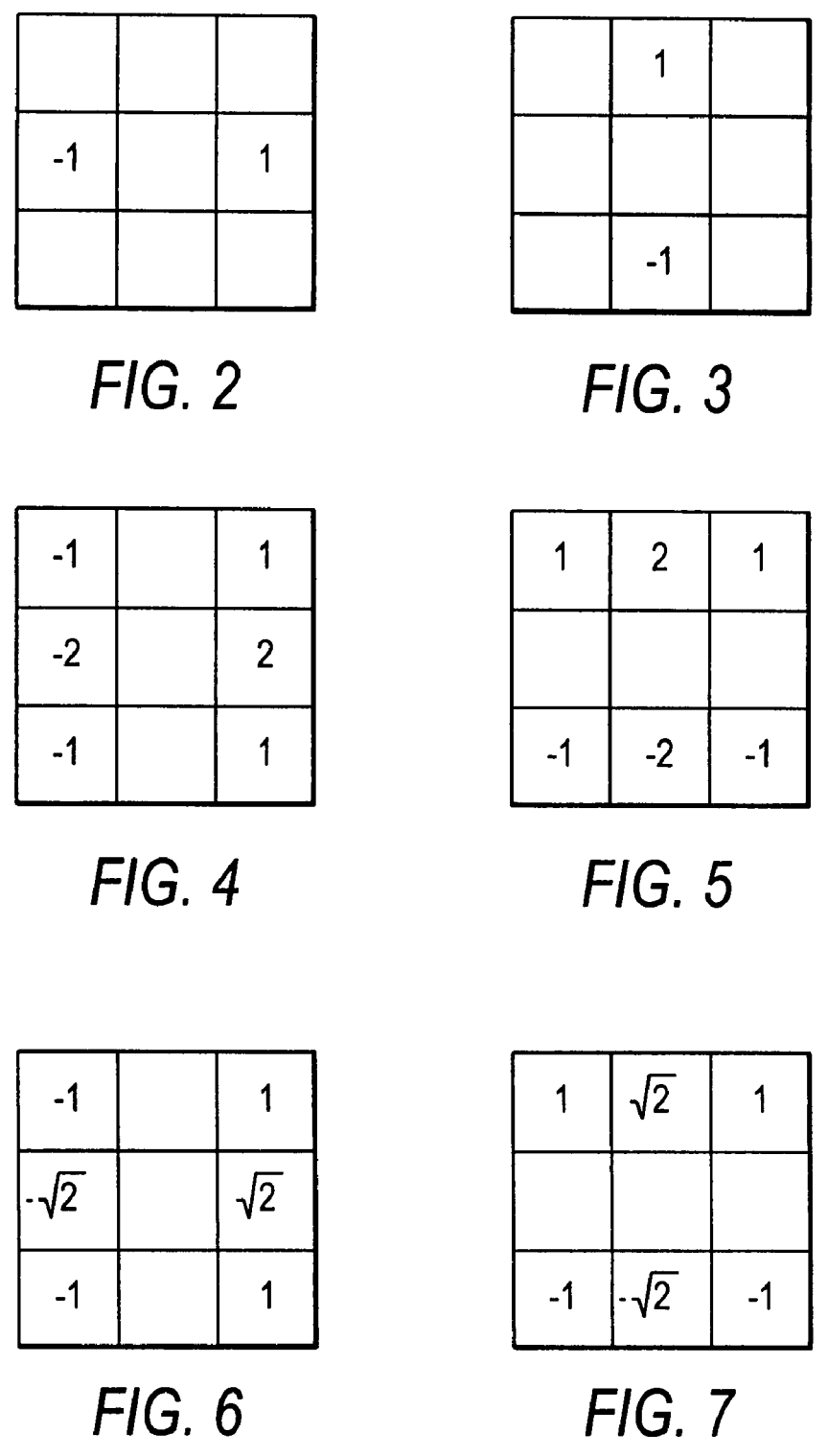

In this section, one common form is used to express four existing gradient operators; they are: Simple Difference, Sobel, "Isotropic" and Prewitt. The word "Isotropic" is quoted here because, as will be proved later, this operator is not truly isotropic, and this misleading name has been spreading in the image-processing field for more than a decade. A Simple-Difference operator can be expressed pictorially as shown in FIGS. 2-3 and algebraically as:

$$\begin{cases} D_x = \dfrac{1}{2}(F_{x+1,y} - F_{x-1,y}) \\ D_y = \dfrac{1}{2}(F_{x,y+1} - F_{x,y-1}) \end{cases} \quad (4)$$

The Sobel operator can be considered as a Simple-Difference one followed by a triangular smoothing in the orthogonal direction (e.g., the x-derivative is smoothed in the y direction). The weightings are (1, 2, 1). It is expressed as shown in FIGS. 4-5 in conjunction with the following equation:

$$\begin{cases} D_x = \frac{1}{8}(F_{x+1,y+1} + 2F_{x+1,y} + F_{x+1,y-1} - F_{x-1,y+1} - 2F_{x-1,y} - F_{x-1,y-1}) \\ D_y = \frac{1}{8}(F_{x+1,y+1} + 2F_{x,y+1} + F_{x-1,y+1} - F_{x+1,y-1} - 2F_{x,y-1} - F_{x-1,y-1}) \end{cases} \quad (5)$$

The "Isotropic" is shown in FIGS. 6-7 in conjunction with the following equation:

$$\begin{cases} D_x = \frac{1}{2(2+\sqrt{2})}\begin{pmatrix} F_{x+1,y+1} + \sqrt{2}F_{x+1,y} + F_{x+1,y-1} - \\ F_{x-1,y+1} - \sqrt{2}F_{x-1,y} - F_{x-1,y-1} \end{pmatrix} \\ D_y = \frac{1}{2(2+\sqrt{2})}\begin{pmatrix} F_{x+1,y+1} + \sqrt{2}F_{x,y+1} + F_{x-1,y+1} - \\ F_{x+1,y-1} - \sqrt{2}F_{x,y-1} - F_{x-1,y-1} \end{pmatrix} \end{cases} \quad (6)$$

Figures 8, 9, 10, 11, 12, 13:
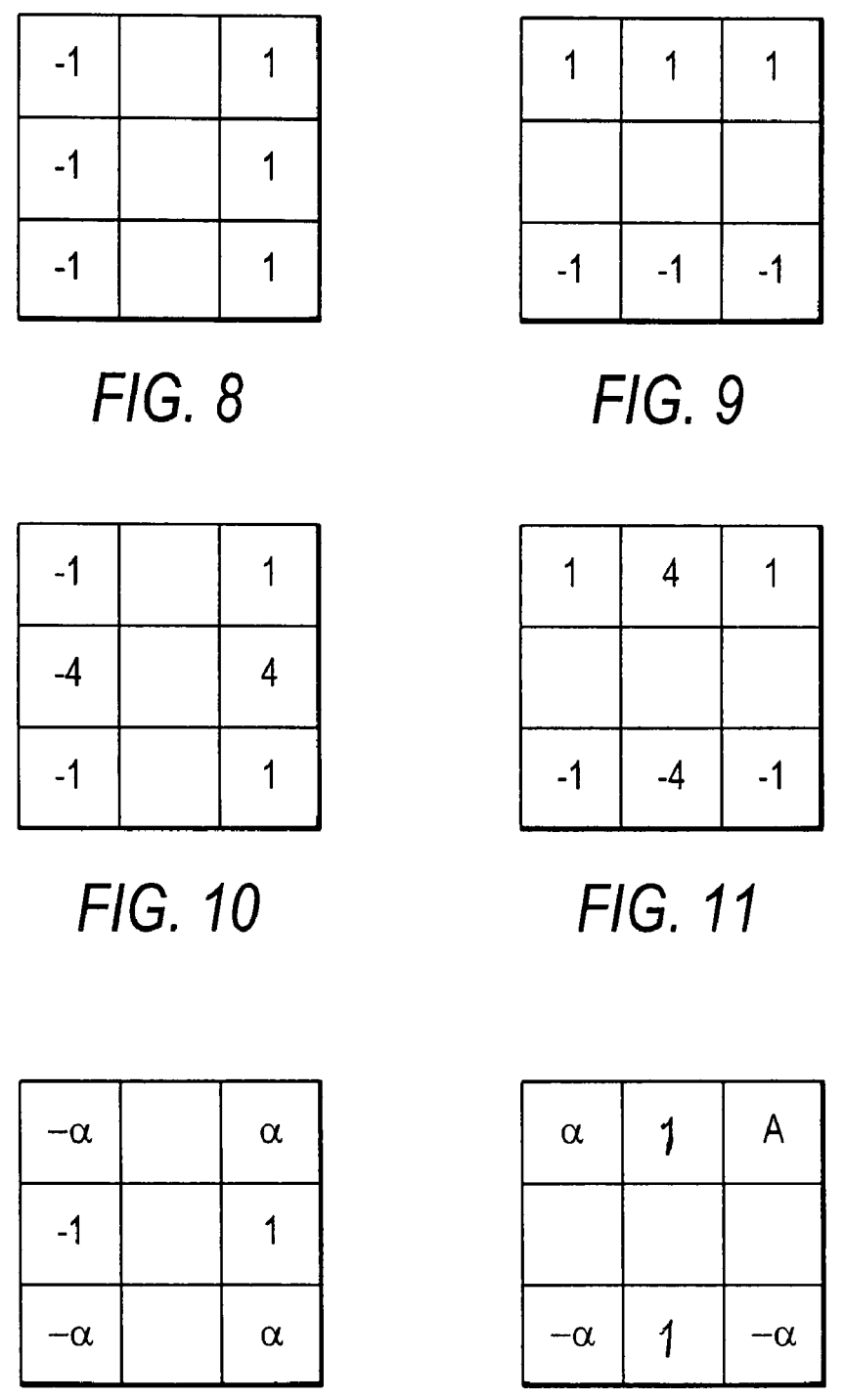

The Prewitt gradient operator is similar to Sobel with different weighting factors (1, 1, 1) used for smoothing. Its expression is shown in FIGS. 8-9 in conjunction with the following equation:

$$\begin{cases} D_x = \frac{1}{6}(F_{x+1,y+1} + F_{x+1,y} + F_{x+1,y-1} - F_{x-1,y+1} - F_{x-1,y} - F_{x-1,y-1}) \\ D_y = \frac{1}{6}(F_{x+1,y+1} + F_{x,y+1} + F_{x-1,y+1} - F_{x+1,y-1} - F_{x,y-1} - F_{x-1,y-1}) \end{cases} \quad (7)$$

As will be discussed in the next section, and for comparison, the new 2D gradient operator of the present invention uses weighting factors (1, 4, 1). Its expression is shown in FIGS. 10-11 in conjunction with the following equation:

$$\begin{cases} D_x = \frac{1}{12}\begin{pmatrix} F_{x+1,y+1} + 4F_{x+1,y} + F_{x+1,y-1} - \\ F_{x-1,y+1} - 4F_{x-1,y} - F_{x-1,y-1} \end{pmatrix} \\ D_y = \frac{1}{12}\begin{pmatrix} F_{x+1,y+1} + 4F_{x,y+1} + F_{x-1,y+1} - \\ F_{x+1,y-1} - 4F_{x,y-1} - F_{x-1,y-1} \end{pmatrix} \end{cases} \quad (8)$$

Now, all above gradient operators are summarized below in a common form with an adjustable parameter $\alpha$ as shown in FIGS. 12-13 in conjunction with the following equation:

$$\begin{cases} D_x = \frac{1}{(2+4\alpha)}\left[ \begin{matrix} F_{x+1,y} - F_{x-1,y} + \alpha \cdot \\ (F_{x+1,y+1} + F_{x+1,y-1} - F_{x-1,y+1} - F_{x-1,y-1}) \end{matrix} \right] \\ D_y = \frac{1}{(2+4\alpha)}\left[ \begin{matrix} F_{x,y+1} - F_{x,y-1} + \alpha \cdot \\ (F_{x+1,y+1} + F_{x-1,y+1} - F_{x+1,y-1} - F_{x-1,y-1}) \end{matrix} \right] \end{cases} \quad (9)$$

It is clear that all aforementioned operators are but special cases of this generic parameterized operator, with $\alpha$ defined as follows:

$$\alpha = \begin{cases} 0 & \text{Simple difference} \\ 1/2 & \text{Sobel} \\ 1/\sqrt{2} & \text{"Isotropic"} \\ 1 & \text{Prewitt} \\ 1/4 & \text{Enhanced isotropic (disclosed herein)} \end{cases} \quad (10)$$

As shown herein, the determination that $\alpha=\frac{1}{4}$ is a preferred value for the 2D operator is derived and proven.

Derivation of Enhanced Isotropic Gradient Operator

In this section a relationship between the parameter $\alpha$, the plane-wave frequency and direction, is derived analytically by matching the directions of numerical and analytical gradients. From such a relationship it can be determined that $\alpha=\frac{1}{4}$ is a preferred value for the 2D operator.

Applying the gradient operator of Equation (9) to the plane-wave function of equation (1), one obtains:

$$\begin{cases} D_x = \frac{1+2\alpha\cdot\cos(k\pi\cos\theta)}{1+2\alpha}\text{iF}\sin(k\pi\sin\theta) \\ D_y = \frac{1+2\alpha\cdot\cos(k\pi\sin\theta)}{1+2\alpha}\text{iF}\sin(k\pi\cos\theta) \end{cases} \quad (11)$$

Introducing the following abbreviations to alleviate the lengthy expressions, $$\begin{cases} Sx = \sin(k\pi d_x) = \sin(k\pi\sin\theta) \\ Sy = \sin(k\pi d_y) = \sin(k\pi\cos\theta) \\ Cx = \cos(k\pi d_x) = \cos(k\pi\sin\theta) \\ Cy = \cos(k\pi d_y) = \cos(k\pi\cos\theta) \end{cases} \quad (12)$$

equation (11) reduces to $$\begin{cases} D_x(k,\theta) = \frac{1+2\alpha\cdot Cy}{1+2\alpha}\text{iF}\cdot Sx \\ D_y(k,\theta) = \frac{1+2\alpha\cdot Cx}{1+2\alpha}\text{iF}\cdot Sy \end{cases} \quad (13)$$

Matching the numerical gradient direction with that of the plane wave, one obtains:

$$\frac{D_x}{l_x} = \frac{D_y}{l_y} \quad (14)$$

Inserting equation (13) into (14), the parameter $\alpha$ is derived as a function of plane-wave direction and frequency as follows:

$$\alpha = -\frac{1}{2}\cdot\frac{l_x Sy - l_y Sx}{l_x CxSy - l_y CySx} \quad (15)$$

Equation (15) shows that the parameter $\alpha$ depends on both frequency and angle. The value $\alpha$ is plotted in FIG. 14 against the angle ranging 0 to 90 degrees and the frequency ranging from 0 to 50% Nyquist. Higher frequencies are usually undesirable due to under-sampling problems.

In most applications, the frequency is either unknown or in a wide range, and the angle is a product or output of the application rather than an input. It is preferred that a value for $\alpha$ is chosen such that it is valid for a generic gradient operator regardless of angle and frequency. From FIG. 14, one can observe that the parameter $\alpha$ varies from 0.25 to 0.285. Any value within this range would be a suitable candidate. It is preferred that $\alpha=0.25$ is to be use, which is the value at zero frequency because (a) its reciprocal is an integer, and (b) low frequency content is probably more important for most practical applications. This value leads to the earlier proposed operator in equation (8). If needed, it is possible to finely tune the value of α to minimize errors for any given frequency range regardless of direction. As will be shown in the next section, the angle errors are very small and fine tuning may not be necessary in most cases. As stated before, $\alpha=\frac{1}{4}$ leads to the proposed 2D operator of the present invention.

Numerical Inaccuracy

In order to compare the inaccuracy of various operators, the angle error and magnitude anisotropy are defined as follows:

$$\begin{cases} \text{angle\_error} = \tan^{-1}\left(\frac{D_x(k,\theta)}{D_y(k,\theta)}\right) - \theta \\ \text{magnitude\_anistrophy} = \frac{[|D(k,\theta)| - |D(k,0)|]}{|D(k,0)|} \end{cases} \quad (16)$$

Inserting equation (13) into (16), the inaccuracies become $$\begin{cases} \text{angle\_error} = \tan^{-1}\left(\frac{(1+2\alpha \cdot Cy)Sx}{(1+2\alpha \cdot Cx)Sy}\right) - \theta \\ \text{magnitude\_anistrophy} = \frac{\sqrt{(1+2\alpha \cdot Cy)^2 Sx^2 + (1+2\alpha \cdot Cx)^2 Sy^2}}{k\pi(1+2\alpha)} \cdot \frac{k\pi}{\sin(k\pi)} - 1 \end{cases} \quad (17)$$

Figure 15:
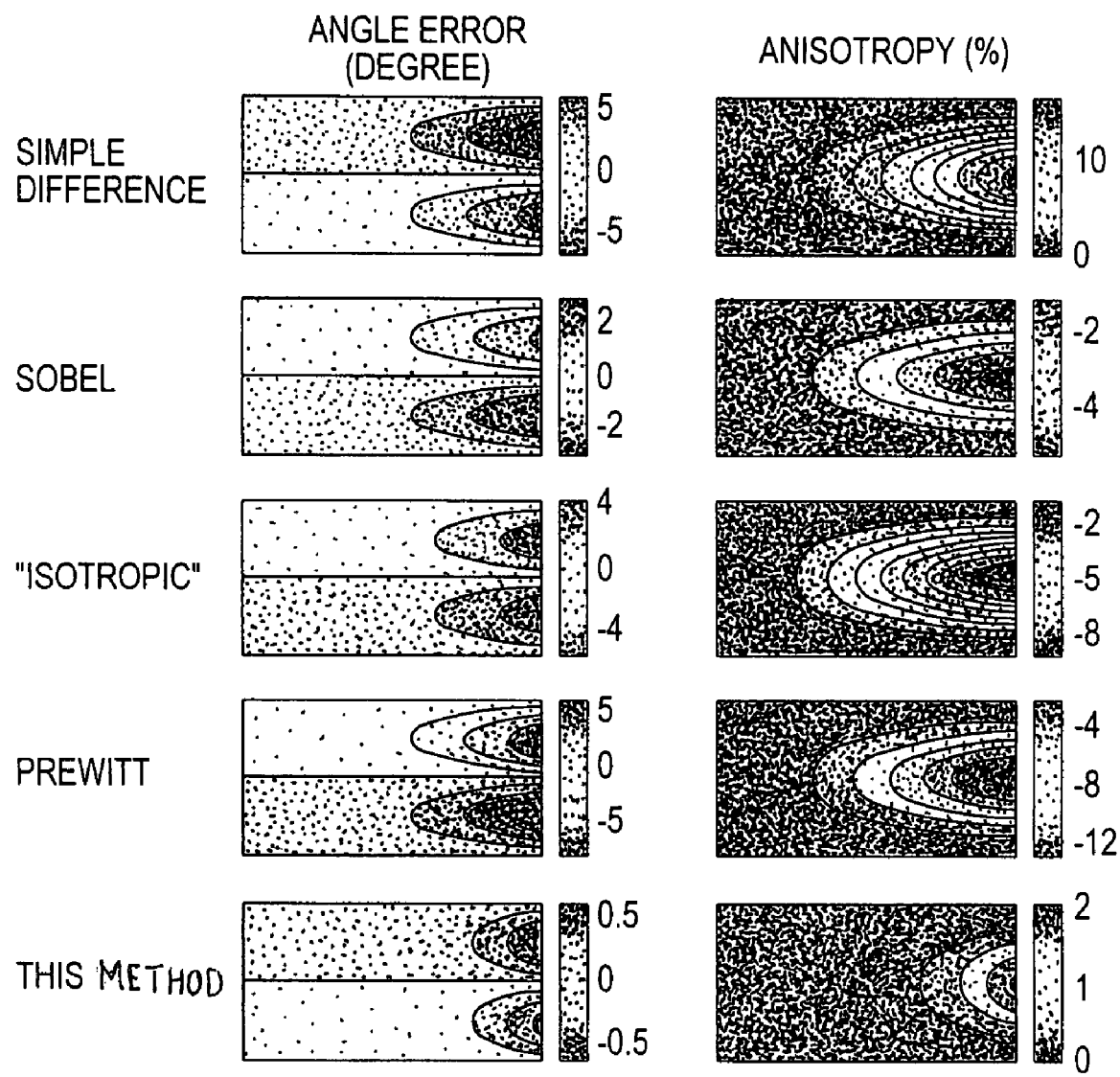
FIG. 15 is a plot of an angle error and magnitude anisotropy of gradient operators with a graded grayscale, with every subplot having the frequency measured along the x-axis ranging from 0 to 50% Nyquist, and the wave angle measured along the y-axis ranging from 0 to 90 degrees.

With the parameter α taking various values depending on the operator (e.g., 0.5 for Sobel and 1 for Prewitt), equation (17) is used to analyze the numerical errors associated with these gradient operators. FIG. 15 plots the resultant angle error and magnitude anisotropy; and Table 1 lists the worst values (i.e., maximum errors) of 2D gradient operators from 0 to 50% Nyquist. Of all the existing four operators, Sobel is deemed best with a 3 degree error in angle and a 5% anisotropy in magnitude. In contrast, the Simple-Difference operator is the worst, with a 7 degree angle error and a 17% anisotropy. As stated earlier, the so-called "Isotropic" operator is not truly isotropic; in fact, its performance is inferior to that of Sobel. On the other hand, the newly proposed operator of the present invention has only a 0.5 degree angle error and a 2% magnitude anisotropy, outperforming all existing operators.

TABLE 1

| Operator | α value | Angle error | Anisotropy |
| --- | --- | --- | --- |
| Simple Difference | 0 | 7.6° | 17% |
| Sobel | ½ | 3.2° | 5% |
| "Isotropic" | $1/\sqrt{2}$ | 5.4° | 9% |
| Prewitt | 1 | 7.2° | 13% |
| Present Invention | ¼ | 0.5° | 2% |

3D Gradient Operator

The 2D methodology can be readily extended to construct a 3D enhanced isotropic gradient operator. A plane-wave function in 3D can be expressed as $$F(x, y, z) = \exp\{-i\pi k(l_x x + l_y y + l_z z)\} \quad (18)$$

$$\begin{cases} l_x = \sin\theta\sin\phi \\ l_y = \sin\theta\cos\phi \\ l_z = \cos\theta \end{cases}$$

in which (x, y, z) are grid coordinates and take values of integer numbers, l is the directional vector of plane waves, k is the frequency scaled by the Nyquist limit, and θ and φ are dip and azimuth angles.

Two parameters (α and β) are utilized to construct the 3D operator:

$$D_x = \frac{1}{(2+8\alpha+8\beta)} \begin{bmatrix} F_{x+1,y,z} - F_{x-1,y,z} + \alpha \cdot (F_{x+1,y+1,z} + \\ F_{x+1,y-1,z} + F_{x+1,y,z+1} + F_{x+1,y,z-1}) - \\ \alpha \cdot (F_{x-1,y+1,z} + F_{x-1,y-1,z} + F_{x-1,y,z+1} + \\ F_{x-1,y,z-1}) + \beta \cdot (F_{x+1,y+1,z+1} + F_{x+1,y+1,z-1} + \\ F_{x+1,y-1,z+1} + F_{x+1,y-1,z-1}) - \beta \cdot (F_{x-1,y+1,z+1} + \\ F_{x-1,y+1,z-1} + F_{x-1,y-1,z+1} + F_{x-1,y-1,z-1}) \end{bmatrix} \quad (19)$$

$$D_y = \frac{1}{(2+8\alpha+8\beta)} \begin{bmatrix} F_{x,y+1,z} - F_{x,y-1,z} + \alpha \cdot (F_{x+1,y+1,z} + \\ F_{x-1,y+1,z} + F_{x,y+1,z+1} + F_{x,y+1,z-1}) - \\ \alpha \cdot (F_{x+1,y-1,z} + F_{x-1,y-1,z} + F_{x,y-1,z+1} + \\ F_{x,y-1,z-1}) + \beta \cdot (F_{x+1,y+1,z+1} + F_{x+1,y+1,z-1} + \\ F_{x-1,y+1,z+1} + F_{x-1,y+1,z-1}) - \beta \cdot (F_{x+1,y-1,z+1} + \\ F_{x+1,y-1,z-1} + F_{x-1,y-1,z+1} + F_{x-1,y-1,z-1}) \end{bmatrix}$$

$$D_z = \frac{1}{(2+8\alpha+8\beta)} \begin{bmatrix} F_{x,y,z+1} - F_{x,y,z-1} + \alpha \cdot (F_{x+1,y,z+1} + \\ F_{x-1,y,z+1} + F_{x,y+1,z+1} + F_{x,y-1,z+1}) - \\ \alpha \cdot (F_{x+1,y,z-1} + F_{x-1,y,z-1} + F_{x,y+1,z-1} + \\ F_{x,y-1,z-1}) + \beta \cdot (F_{x+1,y+1,z+1} + F_{x+1,y-1,z+1} + \\ F_{x-1,y+1,z+1} + F_{x-1,y-1,z+1}) - \beta \cdot (F_{x+1,y+1,z-1} + \\ F_{x+1,y-1,z-1} + F_{x-1,y+1,z-1} + F_{x-1,y-1,z-1}) \end{bmatrix}$$

The x-component of the operator in equation (19) can be viewed as a Simple-Difference operator on the x-direction followed by smoothing on the y-z plane. For example, the $D_x$ operator (which is a 3×3 cube) can be represented by three slices shown in FIGS. 16-18.

The 3D operator can be constructed by stacking the three slices together along the z direction (out of the page).

With α and β taking different values, different 3D gradient operators are obtained:

$$(\alpha, \beta) = \begin{cases} (0, 0); & \text{Simple difference} \\ (1/\sqrt{2}, 1/\sqrt{3}); & \text{"Isotropic"} \\ (0.245, 0.85); & \text{Enhanced isotropic (disclosed herein)} \end{cases} \quad (20)$$

By substituting the 3D plane-wave equation (17) into the gradient operator (19), and after simplification one obtains:

$$\begin{cases} D_x = iFSx\dfrac{1+2\alpha(Cy+Cz)+4\beta CyCz}{1+4\alpha+4\beta} \\ D_y = iFSy\dfrac{1+2\alpha(Cz+Cx)+4\beta CzCx}{1+4\alpha+4\beta} \\ D_z = iFSz\dfrac{1+2\alpha(Cx+Cy)+4\beta CxCy}{1+4\alpha+4\beta} \end{cases} \quad (21)$$

where the abbreviations are defined as follow:

$$\begin{cases} Sx = \sin(\pi k l_x) \\ Cx = \cos(\pi k l_x) \\ Sy = \sin(\pi k l_y) \\ Cy = \cos(\pi k l_y) \\ Sz = \sin(\pi k l_z) \\ Cz = \cos(\pi k l_z) \end{cases} \quad (22)$$

As with the 2D case, the parameters $\alpha$ and $\beta$ in equation (21) depend on both direction and frequency of plane waves. Equating the direction of the numerical gradient with that of the plane wave, one obtains the constraining equations:

$$\dfrac{D_x}{l_x} = \dfrac{D_y}{l_y} = \dfrac{D_z}{l_z} \quad (23)$$

Substituting equation (21) into (23), and solving a pair of linear equations for $\alpha$ and $\beta$, one obtains:

$$\begin{cases} \alpha = -\dfrac{1}{2}\left[\dfrac{l_x Cx(Cy-Cz)/Sx + l_y Cy(Cz-Cx)/Sy + l_z Cz(Cx-Cy)/Sz}{l_x Cx^2(Cy-Cz)/Sx + l_y Cy^2(Cz-Cx)/Sy + l_z Cz^2(Cx-Cy)/Sz}\right] \\ \beta = \dfrac{1}{4}\left[\dfrac{l_x(Cy-Cz)/Sx + l_y(Cz-Cx)/Sy + l_z(Cx-Cy)/Sz}{l_x Cx^2(Cy-Cz)/Sx + l_y Cy^2(Cz-Cx)/Sy + l_z Cz^2(Cx-Cy)/Sz}\right] \end{cases} \quad (24)$$

Figure 16:
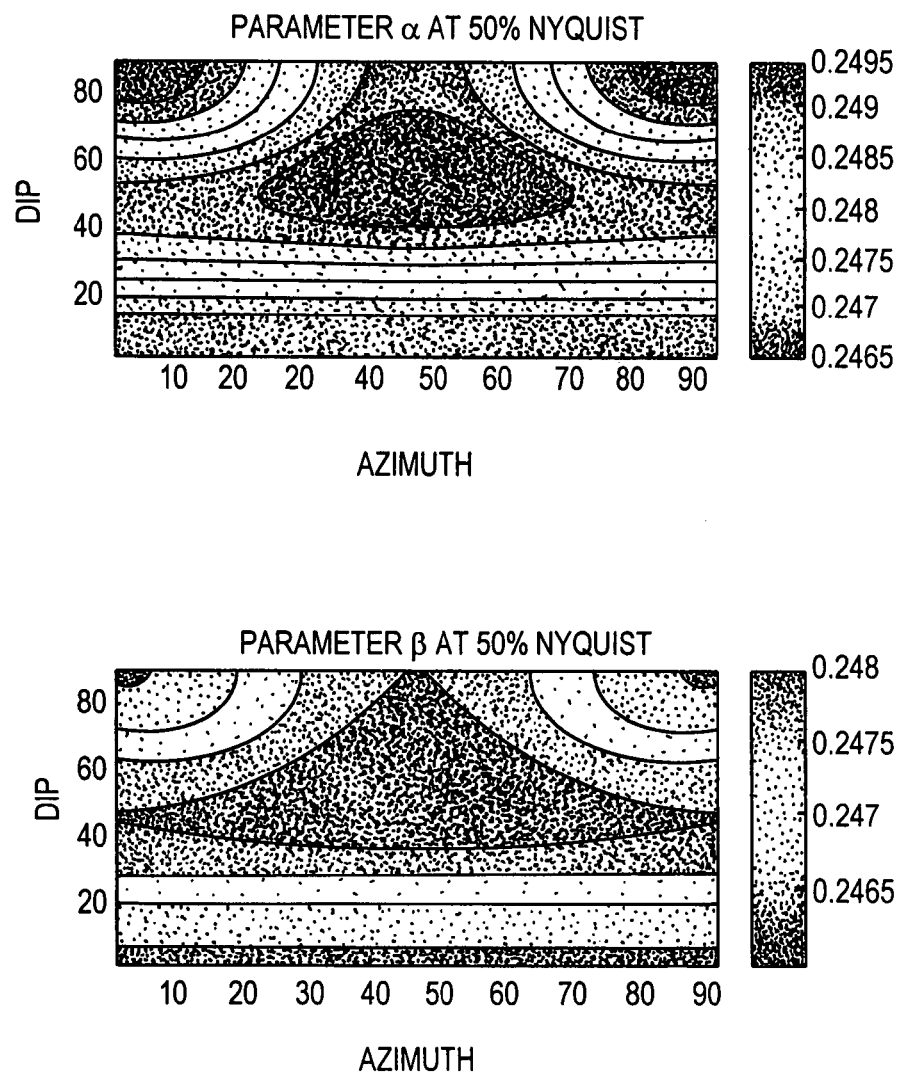
FIG. 16 is a plot of exact values of parameters α and β at 50% Nyquist with a banded grayscale, with the choice of α=0.245 and β=0.085 corresponding to the 3D gradient operator of the present invention.
Figure 17:
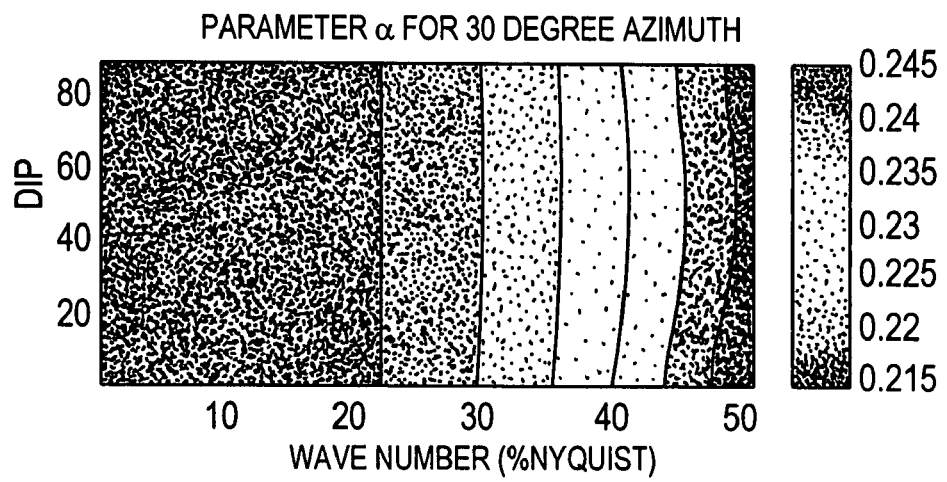
FIG. 17 is a plot of exact values of parameters α and β at 30-degree azimuth with a banded grayscale, with the choice of α=0.245 and β=0.085 corresponding to the 3D gradient operator of the present invention.
Figure 17:
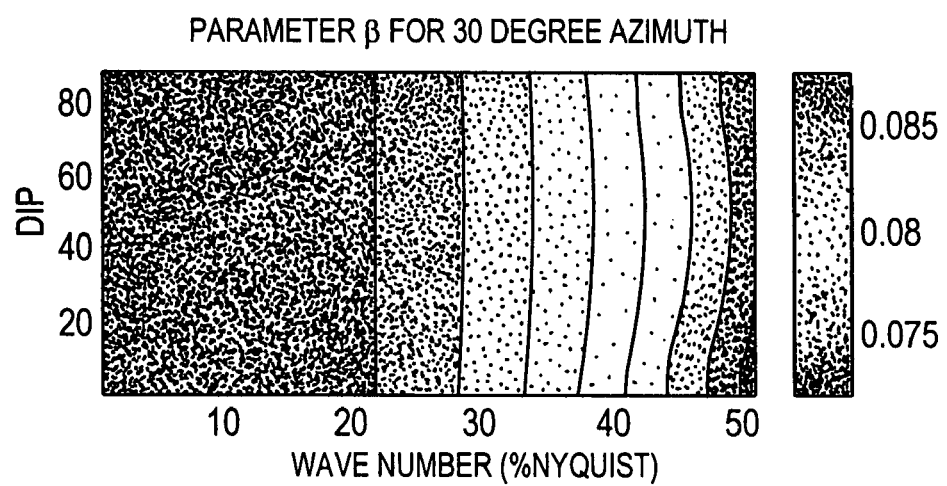

As expected, the parameters $\alpha$ and $\beta$ are functions of the three variables dip, azimuth and frequency, so they actually form 3D cubes. For easier viewing, such cubes and display values of slices are cut through and illustrated. At a fixed frequency of 50% Nyquist, parameters $\alpha$ and $\beta$ are illustrated in FIG. 16. Another slice with azimuth of 30 degrees is shown in FIG. 17. In the entire set of $\alpha$ and $\beta$ cubes, the parameter $\alpha$ varies in the range of 0.215 to 0.2495, and parameter $\beta$ is bound in the range of 0.0714 to 0.089. With this small range of variation for $\alpha$ and $\beta$, the inaccuracies of operators can be studied for different permutations of pairs before proposing an optimal one.

As with 2D, to measure the inaccuracy, the magnitude anisotropy and the angle error in the 3D case are defined as:

$$\begin{cases} \text{angle\_error} = \cos^{-1}\left(\dfrac{\vec{D}\cdot\vec{l}}{|\vec{D}|}\right) \\ \text{magnitude\_anistrophy} = \dfrac{||D(k,\theta,\phi)|-|D(k,0,0)||}{|D(k,0,0)|} \end{cases} \quad (25)$$

Here, $\vec{D}$ is the numerical gradient vector, $\vec{l}$ is the vector for the analytic gradient direction, which is the same as the plane-wave direction.

Figure 18:
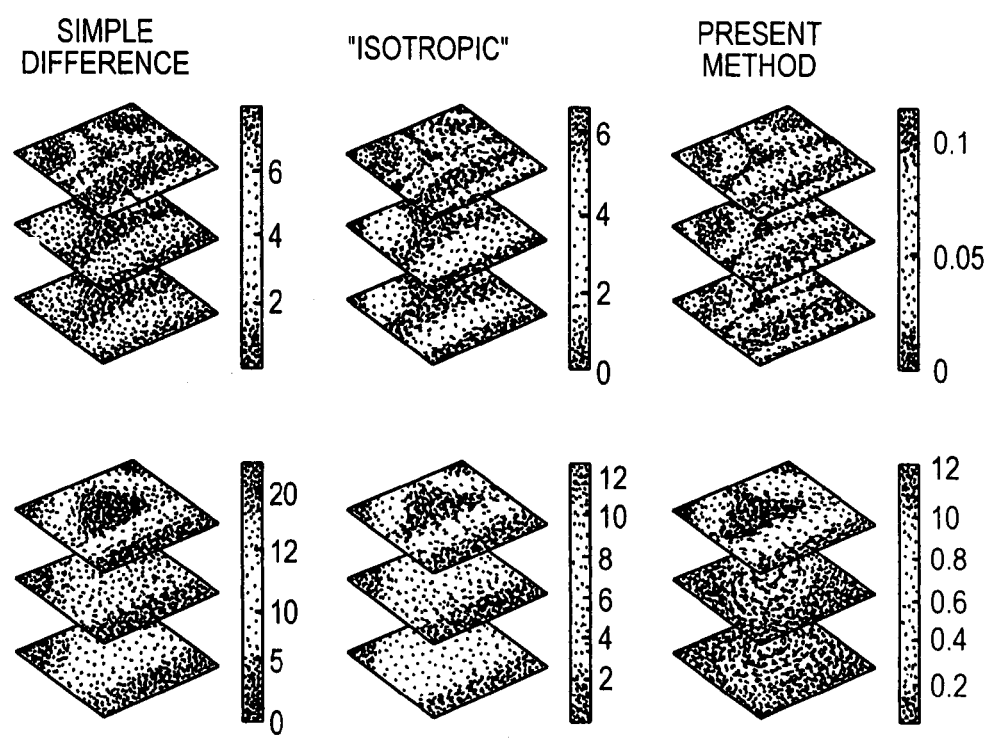
FIG. 18 illustrates plots of the performance of gradient operators measured by an angle error and magnitude anisotropy, with three slices of each subplot illustrated for frequencies of 10%, 30% and 50% Nyquist from the bottom plot upward, with different scales for each subplot.

FIG. 18 exhibits the angle error of the operator with the fixed $\alpha$ and $\beta$ values. Table 2 summarizes the maximum errors of 3D gradient operators for the frequency range from 0 to 50% Nyquist.

TABLE 2

| Operator | $\alpha$ value | $\beta$ value | Angle error | Anisotropy |
|---|---|---|---|---|
| Simple Difference | 0 | 0 | 7.9° | 22% |
| "Isotropic" | $1/\sqrt{2}$ | $1/\sqrt{3}$ | 6.5° | 12% |
| Present Invention | .245 | .085 | 0.11° | 1.2% |

As can be seen in the Table 2 and FIG. 18, a new 3D operator having $\alpha=0.245$ and $\beta=0.085$ can improve the accuracy of the numerical gradients significantly compared to the Simple-Difference and "Isotropic" ones.

While the illustrative embodiments of the invention have been described with particularity, it will be understood that numerous other modifications will be apparent to and can be readily made by those skilled in the art without departing from the spirit and scope of the invention. Accordingly, it is not intended that the scope of the claims appended hereto be limited to the examples and descriptions set forth herein but rather that the claims be construed as encompassing all the features of patentable novelty which reside in the present invention, including all features which would be treated as equivalents thereof by those skilled in the art to which this invention pertains.

We claim:

1. A method for processing a multidimensional image having specified grid locations comprising the steps of:
    a. providing a processor for implementing a gradient operator using a gradient operator parameter as a function of frequency;
    b. adjusting said gradient operator parameter for a frequency range to form an enhanced gradient operator implemented by the processor in order to minimize errors in processing the multidimensional image;
    c. processing said multidimensional image at said grid locations with the enhanced gradient operator having the adjusted parameter to generate a processed image in a memory with reduced anisotropic inaccuracies; and
    d. outputting the processed image.

2. The method of claim 1, wherein step (a) further includes the step of matching analytical and numerical gradients.

3. The method of claim 1, wherein said gradient operator parameter is about 0.25 when the frequency approaches zero.

4. The method of claim 2, wherein the analytical gradient is a plane wave function.

5. The method of claim 1, wherein the enhanced gradient operator includes weighting factors of (1, 4, 1).

6. The method of claim 1 further comprising the step of providing N−1 adjustable parameters for processing the multidimensional image having a dimension N.

7. The method of claim 6, further comprising the step of determining the N−1 adjustable parameter values within the 0-50% Nyquist range.

8. A computer system for processing a multidimensional image having specified grid locations, said computer system comprising:
   a memory; and
   a processor including:
   a. means for providing a gradient operator implemented by the processor and having a gradient operator parameter as a function of frequency;
   b. means for adjusting said gradient operator parameter for a frequency range to form an enhanced gradient operator implemented by the processor in order to minimize errors in processing the multidimensional image;
   c. means for processing said multidimensional image at said grid locations with the enhanced gradient operator having the adjusted parameter to generate a processed image in the memory with reduced anisotropic inaccuracies; and
   d. means for outputting the processed image.

9. The computer system of claim 8, wherein the means of step (a) further includes means for matching analytical and numerical gradients.

10. The computer system of claim 9, wherein the analytical gradient is a plane wave function.

11. The computer system of claim 8, wherein said gradient operator parameter is about 0.25 when the frequency approaches zero.

12. The computer system of claim 8, wherein the enhanced gradient operator includes weighting factors of (1, 4, 1).

13. The computer system of claim 8 further comprising:
   means for providing N−1 adjustable parameters for processing the multidimensional image having a dimension N.

14. The computer system of claim 13, further comprising:
   means for determining the N−1 adjustable parameter values within the 0-50% Nyquist range.

* * * * *